UNITED STATES PATENT OFFICE.

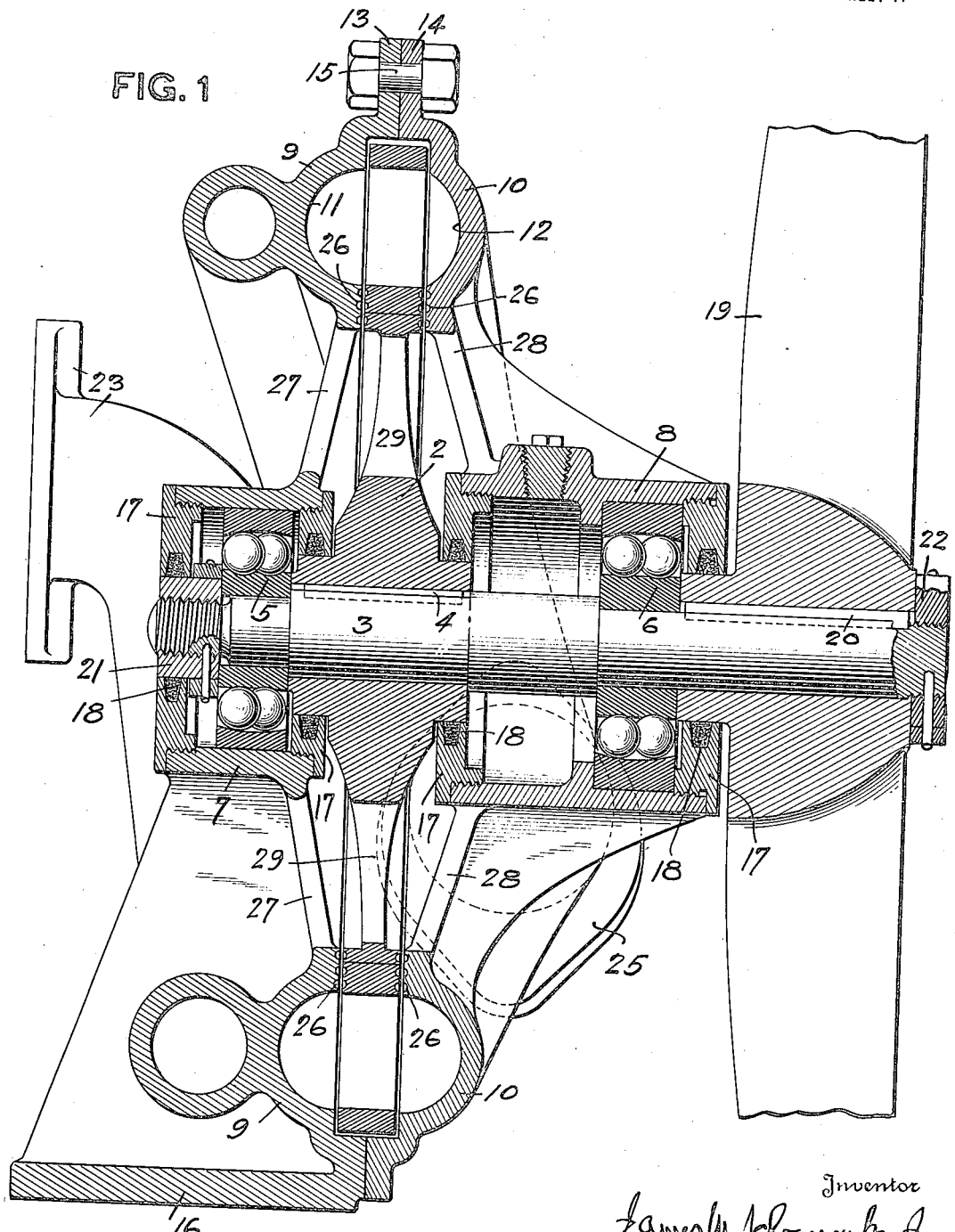

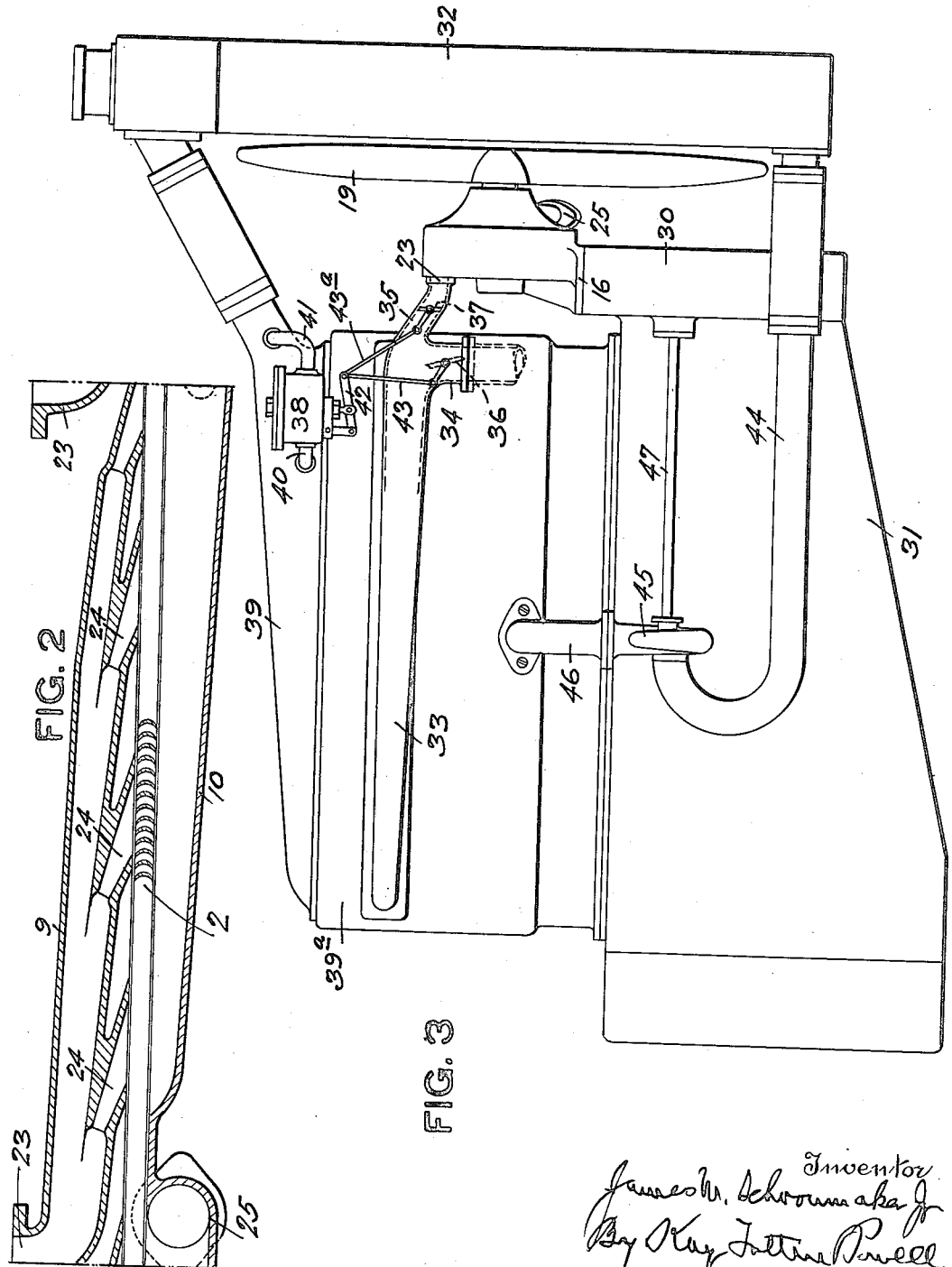

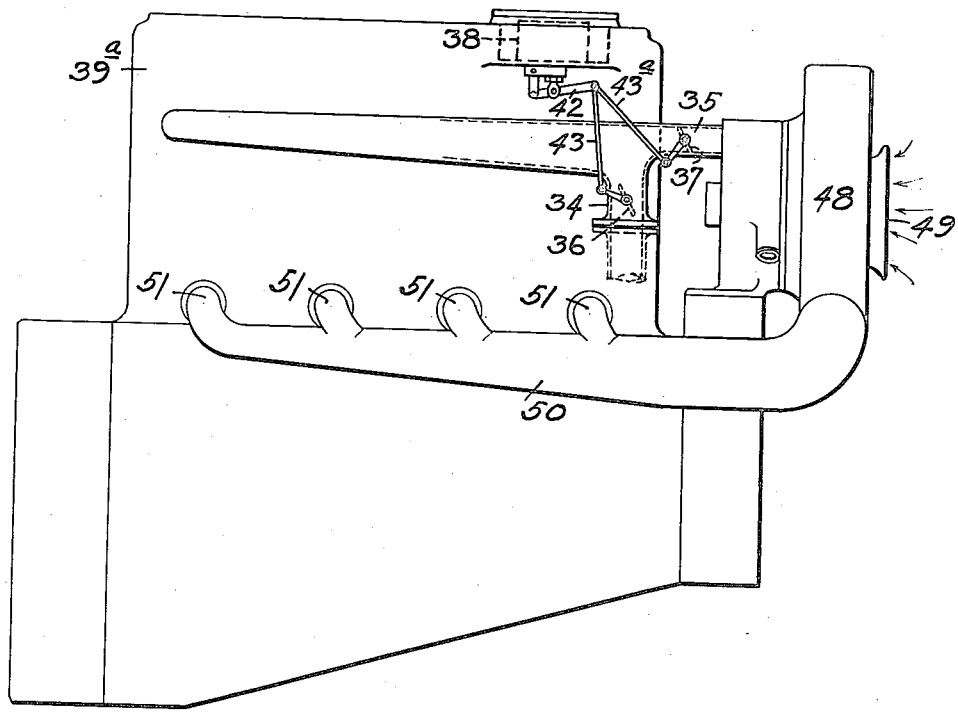
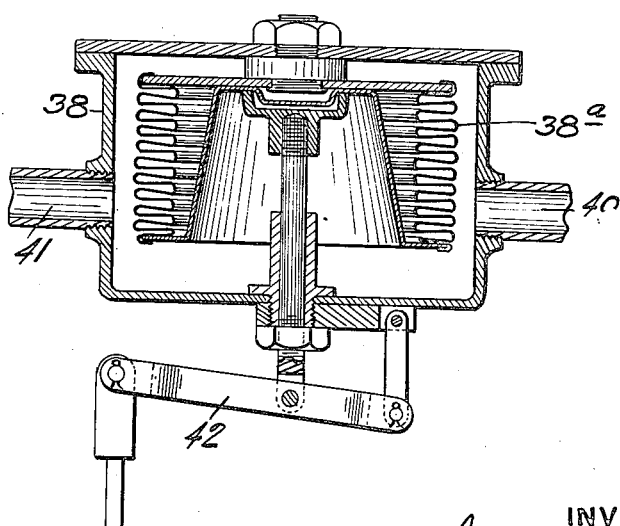

JAMES M. SCHOONMAKER, JR., OF SEWICKLEY, PENNSYLVANIA.

APPARATUS FOR COOLING INTERNAL-COMBUSTION ENGINES.

1,410,726. Specification of Letters Patent. Patented Mar. 28, 1922.

Application filed August 18, 1919. Serial No. 818,269.

*To all whom it may concern:*

Be it known that I, JAMES M. SCHOONMAKER, Jr., a citizen of the United States, and resident of Sewickley, in the county of Allegheny and State of Pennsylvania, have invented a new and useful Improvement in Apparatus for Cooling Internal-Combustion Engines; and I do hereby declare the following to be a full, clear, and exact description thereof.

My invention relates to improvement in cooling means for internal combustion engines, as used more especially for automotive purposes, such as, automobile, truck, tractor, boat and airship propulsion, it is customary to drive the cooling fan or blower by some direct mechanical means, such as, gearing, chain, belt and the like. In this manner, the intensity of the air blast, that is the cooling effect, becomes a function of engine speed only, irrespective of the work done by the engine.

It is a well known fact that the amount of heat to be disposed of by radiation to atmosphere through the cooling system represents a given and practically constant percentage of the total available heat supplied to the engine, thus, at a given speed with wide open throttle, the heat to be dispersed by the cooling system will be greater than with partly closed throttle. It is evident, therefore, that cooling systems as generally applied, the effectiveness of which depends uniquely on engine speed, will result in either over or under cooling at all but one particular set of conditions in the relationship, between speed and torque, or power output.

The maximum thermal efficiency of an internal combustion engine is only obtainable within narrow limits of variation of the cylinder wall temperature from a given condition. Operation either below or above this margin will result in loss of heat or power. It is, therefore, highly desirable to maintain this wall temperature as constant as possible. For the same reason, it is advantageous to heat up the engine from cold in as short as possible a period of time. Another reason for striving to obtain rapid cylinder wall heating to normal, lies in the fact that a cold engine allows the fuel mixture to condense and leak past the piston into the crank case where it deteriorates the lubricating oil. Finally, the piston slap is liable to occur as long as the engine remains relatively cold.

One of the objects of the present invention is to provide for a cooling system which will be proportionate to the actual work done at all times by the engine, in other words, a cooling system, the intenstiy of which will vary as the amount of heat to be disposed of, irrespective of engine speed.

Another object sought is the maintenance of a constant cylinder wall temperature irrespective of disturbing influences, such as increased water flow or varying atmosphere conditions at different seasons or hours of the day, with rapid heating up of the engine from cold to the desired temperature, corresponding to highest thermal efficiency.

In carrying out the invention, it is proposed to drive the cooling fan in the case of water cooled engines, or a blower, in the case of air cooled engines—by means of a turbine, actuated by the exhaust gases from the engine, the flow of which, as far as the turbine is concerned, being governed by a thermostatic control mechanism.

With the above and other objects in view, which will more readily appear as the nature of the invention is better understood, the same consists in the novel construction, combination and arrangement of parts hereinafter more fully described, illustrated, and claimed.

The embodiment of the invention is shown in the accompanying drawings in which,—

Fig. 1—Represents a sectional elevation of the exhaust gas turbine.

Fig. 2—Is a developed section through the inlet gas passages, the nozzles, the rotor, and the exhaust gas collector.

Fig. 3—Represents diagrammatically the installation of the exhaust gas turbine driving a cooling fan in a water-cooled power plant.

Fig. 4—Similarly shows diagrammatically the exhaust gas turbine driving a turbo-blower to supply an air blast for an air cooled engine; and Fig. 5—Is an enlarged sectional view of the thermostat control mechanism.

Similar reference letters designate corresponding parts throughout the several figures of the drawings.

Referring more particularly to Fig. 1, the rotor body 2 is mounted on a central shaft 3 and keyed thereto by means of a key 4. The rotor ring which contains the blades may be either formed separately and of different material from the rotor body 2 secured thereto by shrinking on, or any other suitable means, or else may be formed integrally with 2. Shaft 3 is supported on two bearings 5 and 6 which in this particular embodiment of the invention are shown to be ball bearings. These bearings are supported in housings 7 and 8, which are preferably integral, respectively with the rear half casing 9 and the forward half casing 10, situated on either side of rotor 2. Inlet gas distributing passage 11 and exhaust collector 12 are provided with flanges 13 and 14 respectively. These are held together by bolts 15 and thus constitute in effect the turbine housing or casing. The turbine as a whole is secured to the engine by a flange 16 or any other type of suitable mounting.

Housings 7 and 8 are made dirt and dust proof by means of screwed end plugs 17 carrying felt packing rings 18. The forward end of the shaft 3 carries the cooling fan 19 keyed to the shaft by means of key 20. Nuts 21 and 22 secure respectively the rotor body 2 and bearing 5, and bearing 6 and fan 19 from axial movement along the shaft 3. Axial thrust is taken by bearing 6 which is locked against axial movement in either direction in the housing 8.

The rear or inlet half casing 9 is provided with a gas inlet branch and flange 23 for suitable connection to the exhaust manifold of the engine, and it further carries the nozzles 24 which may either be formed integrally with 9 as shown in Fig. 2 or said nozzles 24 can be made separately and secured to the casing 9 by any appropriate means.

The forward or exhaust cover is provided with an exhaust branch and flange 25 whereby the gases leave the turbine and may be either allowed to escape freely at this point or else ducted to any desired point by further piping secured to said branch 25.

In order to keep the rotor 2 and also the shaft 3 and bearing 5 and 6 as cool as possible, a labyrinth packing, consisting of a series of circular concentric grooves 26 is formed respectively in rear cover 9 and forward cover 10, to reduce the leakage through the clearance between rotor and end covers. Furthermore, large openings, 27 and 28 are formed in both end covers, to assist in ventilation and prevent heat from traveling by conduction towards the housings 7 and 8. In like fashion large openings or holes 29 are provided for in the rotor body disc 2, to permit cool air to be blown through the turbine substantially at right angles to the plane of rotation of the rotor.

Referring now to Fig. 3 showing the exhaust turbine in its relationship to the cooling system generally, it will be seen that the turbine with its cooling fan 19 is mounted in front of the engine, for instance, in the manner shown on the timing gear case 30 of the engine crank case 31, so as to have the cooling fan 19 situated directly behind the radiator 32 in the usual manner. Exhaust gases from the engine entering the exhaust manifold 33 may either be ducted in the usual way to the muffler by branch 34 or led to the turbine by branch pipe 35. A balanced butterfly-valve 36 is mounted in the branch 34 leading to the muffler; similarly a balanced butterfly-valve 37 is provided for in the branch 35 to the turbine. A thermostat 38 is connected in parallel with the outlet water collector 39, from the engine water-jacket 39$^a$ by means of the two branches 40 and 41, permitting water to flow through the thermostat, which is at the same temperature as that in the collector 39. Expansion and contraction of the thermostat is transmitted to the butterfly-valves 36 and 37 by the lever 42 and links 43 and 43$^a$, in such fashion as to simultaneously open 34 and close 35 and vice-versa, thus permitting the exhaust gases to flow to the muffler or through the turbine, or partly through both in varying amounts. This thermostat is of a common type and as illustrated in Fig. 5 consists of the casing with a copper-bellows 38$^a$ therein filled with some liquid having a high coefficient of expansion such as ether or alcohol. The heat medium, such as air or water, is lead through the casing against the bellows, and the expansion of the liquid causes the bellows to expand or contract, which in the present case operates the lever arm 42, thereby controlling the butterfly-valves 36 and 37.

Water flows up the collector 39 and through thermostat 38, down the radiator 32 where it is cooled and thence through suction pipe 44 to the pump 45. From here it is forced through delivery pipe 46 back into the engine water-jacket 39$^a$. The pump is driven by the engine by means of shaft 47 in any approved way such as from the timing gear case for instance.

In the arrangement shown at Fig. 4 for an air cooled engine, the turbine mounting and gas control are very similar to the arrangement previously described for a water cooled engine, the difference in this case consisting in the turbine driving a turbo-blower 48, having an air inlet 49 which should preferably face in a forward direction in order to benefit of the resulting velocity head, and a discharge pipe 50, having branches 51 leading to the several cylinders, which it is proposed to supply with a blast of cold air for cooling purposes; further, the thermostat 38 is mounted within the casing 39$^a$ at some convenient location within the air discharged zone, in order to subject it to the maximum air temperature at all times.

The action in all cases is as follows:—

In starting up the engine from cold, the thermostat being in a contracted state, the butterfly-valve 36 will be open, while butterfly 37 remains closed. In this manner, all exhaust gases will go to the muffler, the turbine remaining idle. Thus the engine will be rapidly heated up to operating temperature, which is a desirable feature in the operation of internal combustion engines, in order to secure maximum thermal efficiency. As soon as the engine warm up, causing increase of temperature of either the cooling water or the air surrounding cylinders, the thermostat will expand more or less. This causes the valve 36 of the muffler to partly close, whereas the valve 37 commences to open. A certain amount of exhaust gas now is admitted to the turbine, with the result that fan 19 or turbo-blower 48 commences to revolve and increase the cooling. Any drop of temperature after this will reduce the amount of exhaust gas admitted to the turbine whereas a further increase of temperature will cause the turbine to revolve faster, thereby increasing still further the cooling effect. Maximum cooling will be obtained when valve 36 is entirely closed and all exhaust gas passes through valve 37, which will be wide open, to the turbine.

From the foregoing it will be understood that a novel and distinctive feature of the present invention is the provision of means whereby a cooling system is obtained the intensity of which is proportionate to the engine power output, or torque, irrespective of speed, whereas the thermostatic control of the exhaust gases from the engine provides for a constant working temperature of the power plant irrespective of speed or torque, with rapid heating up of the cylinder walls from cold up to the normal desired temperature of normal operation.

What I claim is:—

1. In apparatus for cooling internal combustion engines, the combination of a turbine, connections between said turbine and the exhaust of said engine, air agitating means, connections between said turbine and said air agitating means, and means for varying the speed of said turbine in proportion to the heat to be disposed of.

2. In apparatus for cooling internal combustion engines, the combination of a turbine, connections between said turbine and the exhaust of said engine, thermostatic means for controlling the exhaust gases delivered to said turbine, air agitating means, and connections between said turbine and said air agitating means.

3. In apparatus for cooling internal combustion engines, the combination of a turbine, connections between said turbine and the exhaust of said engine, valves controlling the exhaust of said turbine and the main exhaust, a thermostat, connections between said valves and said thermostat, whereby said valves are operated synchronously, and air agitating means operated by said turbine.

4. In apparatus for cooling internal combustion engines, the combination of a turbine, connections between said turbine and the exhaust of said engine, butterfly-valves in said connection to said turbine and in the main exhaust, a thermostat, connections between said valves and said thermostat, whereby said valves are operated synchronously, and air agitating means operated by said turbine.

5. In apparatus for cooling internal combustion engines, the combination of a turbine, connections between said turbine and the exhaust of said engine, a valve in said last named connection, a valve in the main exhaust, a thermostat located in the circulation, connections between said thermostat and said valves, whereby the same are operated synchronously, and air agitating means operated by said turbine.

In testimony whereof I, the said JAMES M. SCHOONMAKER, Jr., have hereunto set my hand.

JAMES M. SCHOONMAKER, JR.

Witnesses:
ROBT. D. TOTTEN,
JOHN F. WILL.